July 14, 1959 E. B. JONES ET AL 2,894,312
CONCRETE FORMS
Filed March 1, 1954 5 Sheets-Sheet 1

INVENTORS.
Edward B. Jones
Amoul A. Jones
BY
ATTORNEY

July 14, 1959

E. B. JONES ET AL 2,894,312

CONCRETE FORMS

Filed March 1, 1954

INVENTOR.
EDWARD B. JONES
AMOUL A. JONES
BY

*Horace B. Van Valkenburgh*

ATTORNEY

July 14, 1959 E. B. JONES ET AL 2,894,312
CONCRETE FORMS
Filed March 1, 1954 5 Sheets-Sheet 4

INVENTORS.
Edward B. Jones
Amoul A. Jones
BY
Horace B. Van Valkenburgh
ATTORNEY

July 14, 1959 E. B. JONES ET AL 2,894,312
CONCRETE FORMS
Filed March 1, 1954 5 Sheets-Sheet 5

INVENTORS.
Edward B. Jones
Amoul A. Jones
BY
ATTORNEY

# United States Patent Office 2,894,312
Patented July 14, 1959

2,894,312
CONCRETE FORMS

Edward B. Jones, Denver, and Amoul A. Jones, Mount Morrison, Colo.

Application March 1, 1954, Serial No. 413,020

12 Claims. (Cl. 25—131.5)

This invention relates to forms for pouring concrete and the like, such as to provide slabs, walls, beams, columns and similar concrete construction elements, particularly for buildings. The slabs to be poured will generally be for a floor, ceiling or roof, i.e., spaced above the lowest floor of the building.

Forms for pouring concrete have for some years conventionally been made by attaching wooden planks to studding or joists, each form being individually built for each particular configuration to be produced. After the slab, beam or other forms have been constructed in this manner, reinforcing for the concrete is placed on or within the forms, or mounted in spaced relation thereto by wire spacers or the like, so that after the concrete is poured it will be adequately reinforced. After the concrete has set, the forms are stripped therefrom by complete dismantling, the result being that very little of the lumber is conveniently usable again without considerable difficulty, and even though a low grade of lumber is initially used, the cost of the discarded lumber is still quite high. The necessity for cutting and fitting all of the lumber going into the forms, together with the problems of adequate support for slab and beam forms, and adequate reinforcement or lateral support for wall and column forms has resulted in a high labor cost for form erection. In addition, the labor cost involved in stripping the forms from the set concrete is also high.

Among the objects of the present invention are to provide a novel beam form; to provide a novel column form; to provide a novel slab form; to provide a novel wall form; to provide a concrete form which may include panels and other parts which may be used many times without substantial deterioration; to provide such panels which are novel in construction and which are useful not only in providing slab forms but also in providing wall forms; to provide such panels which are readily secured together, which are readily supported for use in slab forms and which are readily braced for use in wall forms; to provide novel structure for supporting such panels to provide slab forms; to provide such panels and such structure which require a comparative minimum of time for erection and for dismantling; to provide a novel clip which may be utilized in removably attaching a pair of panels or the like together; to provide novel elements, such as a corner support, which may be utilized in horizontal beam forms, vertical column forms, or corners of a wall form; to provide a novel corner construction for a wall form; to provide such forms, panels, and other elements which may be readily constructed on a quantity production basis; to provide various types of forms which utilize parts which are also utilized in other types of forms, thereby reducing the total number of parts to be made; and to provide such forms, panels and other elements and parts which may be made sufficiently rugged to withstand the rigours of hard usage.

Additional objects and the novel features of this invention will become apparent from the description which follows, taken in connection with the accompanying drawings, in which.

Figure 1:
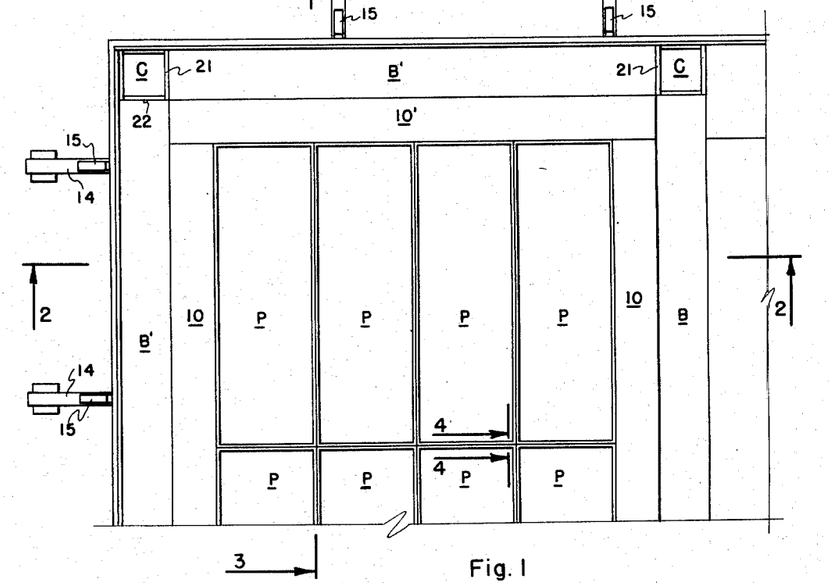
Fig. 1 is a top plan view of a portion of a floor form constructed in accordance with this invention, and on which not only floor slabs but also beams are to be poured.
Figure 2:
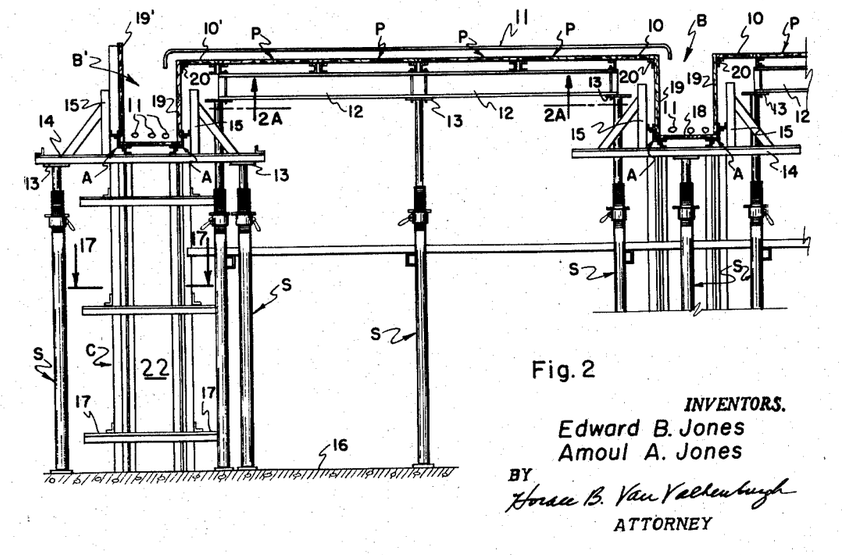
Fig. 2 is a vertical section taken along line 2—2 of Fig. 1.
Figure 2A:
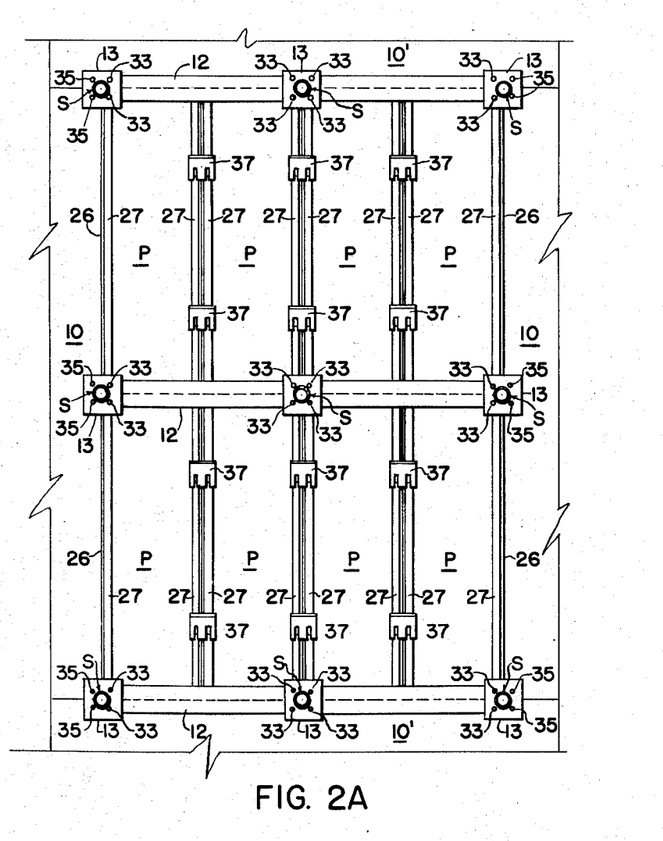
Fig. 2A is a limited horizontal section, looking upwardly from line 2A—2A of Fig. 2.
Figure 3:
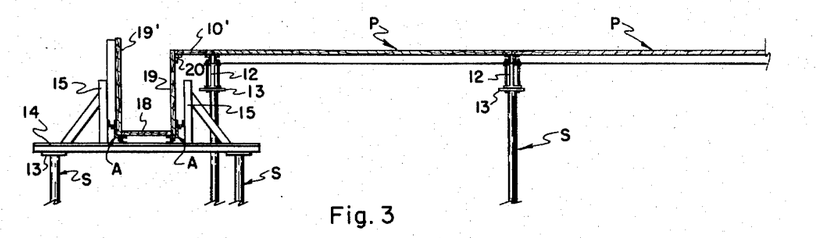
Fig. 3 is a vertical section, taken transversely to the section of Fig. 2, along line 3—3 of Fig. 1.

Illustrated in Figs. 1-3 and constructed in accordance with this invention are a slab form for a floor, which includes a plurality of specially constructed panels P, forms B and B' for a plurality of horizontal beams, preferably formed integrally with the floor, and forms C for supporting columns, all capable of being poured at the same time. Panels P are rectangular in shape, the length preferably being a multiple of the width, such as the former being six feet and the latter two feet, so that a series of panels may be placed side by side to form a square or rectangular supporting surface for the slab, the longitudinal or lateral dimensions of which may be increased by adding additional panels. The entire floor slab to be poured will normally be considerably larger than the portion of the form illustrated in Fig. 1, although it will be evident that additional slab area may be provided merely by increasing the number of panels P and the associated parts involved. The floor slab may be supported by a plurality of horizontal beams, formed in beam forms B and B', in turn supported by columns which are poured in column forms C. The beam forms B are within the confines of the floor slab and the beam forms B' are disposed around the periphery thereof, although it will be understood that the floor slab may overhang the outermost beams along one or more edges.

It will also be understood that the depth of the floor slab, the depth and spacing of the beams, and the size and thickness of the columns, will be determined in accordance with usual architectural design practice. When the distance between beams is not equal to an exact multiple of the width or length of panels P, the peripheral edges of the contiguous panels P are connected by skirts 10 or 10' with the adjacent edges of the beam forms B and B', respectively. Also, the concrete may be reinforced by suitable reinforcing bars 11, which are placed in suitable positions in or on the forms, as in Fig. 2. It will be understood, of course, that suitable reinforcing bars will also be placed within the column forms C.

The panels P are preferably supported by I-beams 12, suitable interengaging means between the I-beams and the panels being provided, in a manner described later, and each I-beam 12, as in Fig. 2, may be supported by a series of shores S which may be of any suitable type, adjustable as to height and each provided at its upper end with a shore plate 13, with interengaging means between the I-beams 12 and shore plates 13 also being provided in a manner described later. Except for plates 13, shores S may be conventional "Acrow" shores, which may also be utilized to support a rail 14 on which a pair of clamps 15 are adjustable inwardly and outwardly, as by a lead screw (not shown), to clamp the sides of the beam form B therebetween, at suitably spaced positions therealong. This rail and clamp construction is also conventional, and other types of clamps and supporting rails or the like may therefore be substituted therefor. The shores S, as well as the column forms C, may rest on a foundation 16, formed of concrete and comprising a floor where desired, or suitable individual foundations for the columns may be provided, with the shores S resting on footings formed of suitable material.

Figures 14, 15:
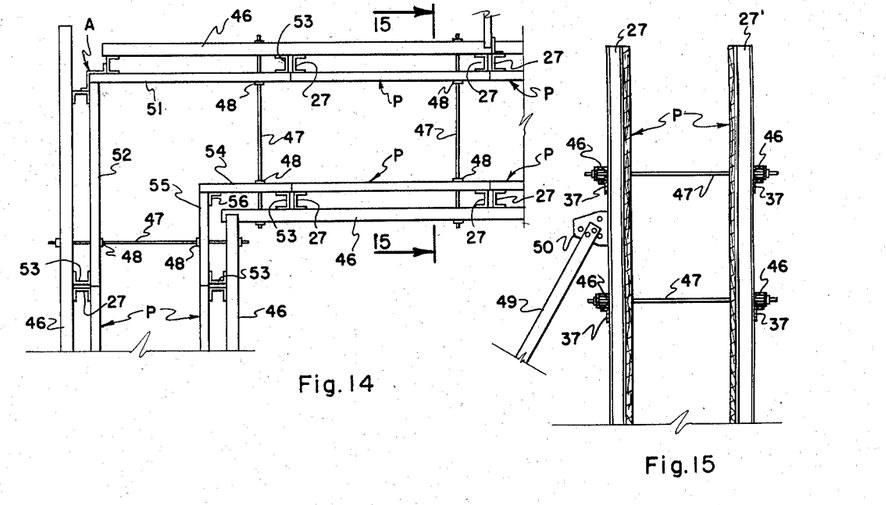
Fig. 14 is a fragmentary top plan view of a wall form, the portion shown including a corner.
Fig. 15 is a vertical section of the upper portion of the wall form, taken along line 15—15 of Fig. 14.

Each lower corner of each beam form B, and also each corner of a column form C, includes an angle or corner support A, which may also be utilized in forming an outside corner of a wall form, as shown in Fig. 14 and described hereinafter. For the beam forms, clamps 15 conveniently engage one outer edge of a corner support A, the other outer edge resting on the rail 14, while clamps 17 encircle the column form and are adapted to engage each of the outer edges of the four corner supports A. The skirts 10 and 10' may be formed from planking, but preferably are formed of plywood of an appropriate thickness, cut to the required width. Also, the bottom members 18 and the side members 19 of each beam form B may similarly be formed of plywood of an appropriate thickness and width, the side members 19 being connected to skirts 10 by angles 20. For the beams B', around the edge of the slab, one side member 19' of the beam form may extend upwardly to a point corresponding to the top of the slab when poured. The side members 21 and end members 22 of the column forms C are also attached to or secured in position by the angle or corner supports A, in a manner described later.

Each of the panels P, as in Figs. 4 to 7, inclusive, may comprise a rectangular sheet 24 of wood, preferably plywood, which is attached, as by screws 25, to a frame which includes a series of angles 26 and 26', the side angles 26 and the end angles 26' being attached together in rectangular relationship with one leg of each angle extending upwardly and the other leg inwardly, the inside edges of the upwardly extending legs forming a space corresponding, as exactly as possible, to the outer periphery of the plywood sheet 24. The ends and sides of the plywood sheets 24 may be bevelled slightly, as in Fig. 4, to eliminate a corner which might engage the usual rounded surface at the inside of an angle 26 or 26', thereby permitting the edge of the sheet to rest on the upper surfaces of the inwardly extending legs of the angles. The angles 26 and 26' are attached, as by welding, to the upper flange of a series of channels 27 and 27', the angles 26 and 26' overlapping the channels for a slight distance on the outside as in Figs. 4, 6 and 7, so that two panels may be placed side by side or end to end with the angles 26 or 26' in abutting relationship. The upper flanges of the channels 27 and 27' and the inwardly extending legs of angles 26 and 26' are provided with holes 28 through which the screws 25 may extend, while the lower flange of each channel 27 and 27' is provided with a series of circular holes 29, disposed in spaced pairs, and another series of holes 30, which are oblong or elongated, for a dual purpose. The oblong holes 30 are preferably disposed in vertical alignment with the screw holes 28 and permit the screws 25 to be driven by an electric screw driver or the like, the oblong holes providing better vision of the operation by the workman. In addition, the oblong holes cooperate with special clips, which will be described in detail later and which are adapted to attach adjacent panels together. At the center of each frame, a channel 31 provides additional support for the plywood sheet 24, the upper flange of channel 31 being provided with the holes 28 for insertion of screws 25 and the lower flange being provided with oblong holes 30 in alignment therewith, to provide ready access to the screw heads. The upper surface of channel 31 is flush with the upper surface of the inwardly extending legs of angles 26', as in Fig. 7, to provide a level support for the plywood sheet 24, while each end of center channel 31 may be cut away, as shown, prior to welding to end channels 27', so as to clear the upper and lower flanges and permit welding to the web of each channel 27'.

Figure 8:
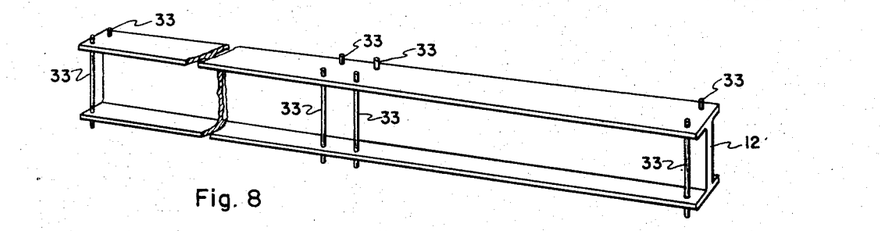
Fig. 8 is a condensed perspective view of a specially constructed I-beam utilized in supporting a series of panels, the I-beam of Fig. 8 being shown in cross section in Fig. 4.

Each of the I-beams 12, as in Fig. 8, is preferably provided with a plurality of pairs of pins 33 which extend through holes drilled in the upper and lower flanges of the I-beam and are attached thereto, as by welding, so that the ends of the pins 33 will extend both above and below the respective flanges. The longitudinal spacing of the pairs of pins 33 is preferably such that a number of panels P, such as four, may be supported side by side on one I-beam 12, as in Fig. 2, with one hole 29 adjacent the end of a side channel 27 of each panel engaging the extending end of one of the pins 33. While additional pins may be provided, it is sufficient that a pair of pins 33 be provided adjacent each end and two pairs of pins 33 at the center of the I-beam, since the interengaging means, formed by the extending ends of the beam pins 33 and the holes 29, prevent the panels P from shifting laterally, and only one pin 33 for each panel P to be connected to an I-beam is thus necessary. The lateral spacing of each pair of pins 33 is preferably such that a series of panels may be abutted in end to end relationship, with the pins on one side of the I-beam engaging the channel holes 29 of the panels on that side and the pins at the opposite side of the I-beam engaging the channel holes 29 of the panels on that side. Of course, if a comparatively thick slab section is to be poured, additional I-beams may be utilized to support the panels, the lateral spacing between the holes 29 thus preferably being the same as the distance between the pins 33 of each pair. For instance, an additional I-beam may be placed beneath the center of a set of four panels P, with an I-beam at each end, although two or more additional I-beams may be placed beneath a set of four panels, if desired.

Figure 4:
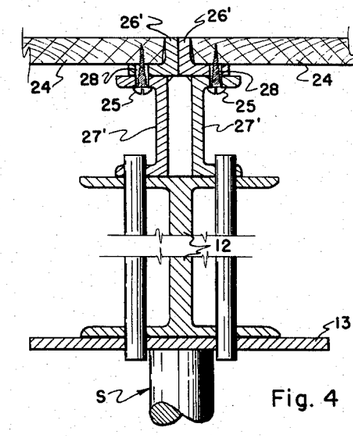
Fig. 4 is an enlarged fragmentary vertical section, taken at the point of intersection of a pair of panels, a supporting beam therefor, and a shore which supports the beam, as at line 4—4 of Fig. 1.
Figure 9:
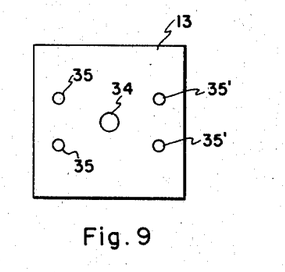
Fig. 9 is a top plan view of a shore plate, also shown in cross section in Fig. 4.

The lower extending ends of the pins 33 also form interengaging means with the shore plates 13. As shown in Fig. 9, each of the shore plates 13 may be provided with a central hole 34 to facilitate welding the plate to the upper end of a shore S, and also with a pair of laterally spaced holes 35 at each side, into which the lower ends of a pair of pins 33 of an I-beam 12 may extend, to releasably lock the shore plate and I-beam together. The longitudinal spacing between the pairs of holes 35 and 35' of the shore plates therefore corresponds to the distance of the end pins 33 from the ends of the I-beams 12, so that the ends of two I-beams, disposed in longitudinal abutting relationship, may rest on the same shore plate. Of course, the position of holes 35 and 35' also corresponds to the spacing of the central pairs of pins 33, so that a shore may be placed at the center of each I-beam, as will be evident from Fig. 2.

Figure 10:
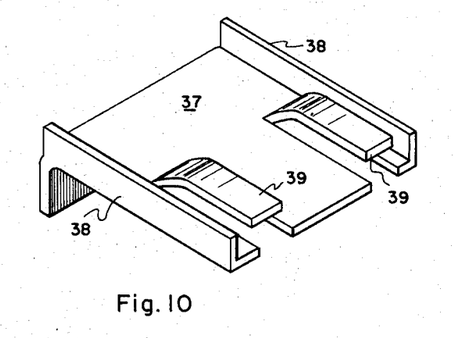
Fig. 10 is a perspective view of a clip adapted to attach two of the panels together.
Figure 11:
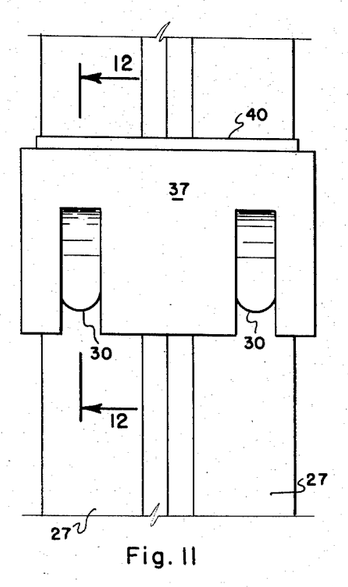
Fig. 11 is a bottom plan view of the clip of Fig. 10, in assembled position attaching two panels together.
Figures 12, 13:
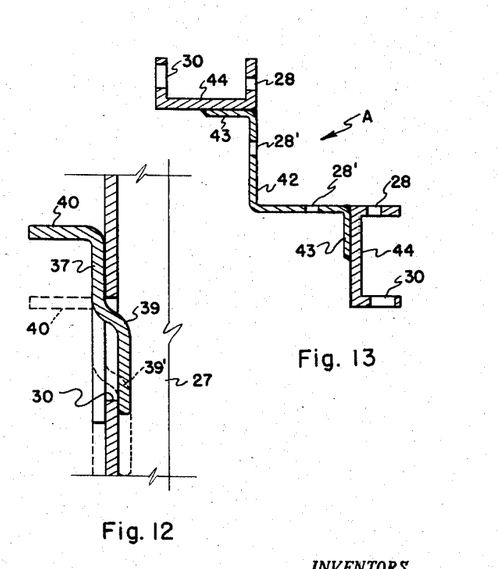
Fig. 12 is a longitudinal section taken along line 12—12 of Fig. 11.
Fig. 13 is a cross section of a specially constructed angle or corner support, particularly useful in forming vertical corners of wall forms, lower corners of horizontal beam forms and vertical corners of rectangular column forms.

A special clip 37 for attaching two panels together, through interengagement with adjacent channels thereof, is illustrated in Figs. 10 to 12. Such a clip may comprise a flat body provided with a flange 38 at each side, which flanges are adapted to engage the inner edges of the adjacent channels 27, as will be evident from Fig. 11. A pair of prongs 39 may be cut out from the body of the clip 37, and shaped so as to extend angularly and then parallel to the clip body, on the same side as the flanges 38. The prongs 39 are adapted to be inserted in the oblong holes 30 of the panel channel flanges, as in Figs. 11 and 12, and the clip then driven to the dotted position of Fig. 12, so that the clip will hold the adjacent channels 27 securely together. At the end opposite the prongs 39, the clip is preferably provided with a transverse flange 40, which extends in a direction opposite to flanges 39, and may be struck by a hammer or the like to drive the clip into position, or to remove the clip when the form is to be disassembled. As will be evident, the prongs 39 have a width slightly less than that of the oblong holes 30, and also provide a clamping effect on the channel flanges, while the side flanges 38 of the clip prevent the abutting panels from moving apart. Any desired number of clips may be utilized, depending upon the tendency for the panels to move apart when the load of concrete is placed thereon, although clips placed near the center of the panels are principally desirable, since the interengaging connection between the ends of the panels and the supporting beams tends to prevent spreading at the ends. Also, the side flanges 38 need not extend perpendicularly to the body of the clip, but may be slanted slightly outwardly, so as to produce a wedging action on the channels as the clip is driven into place.

Figures 5, 6:
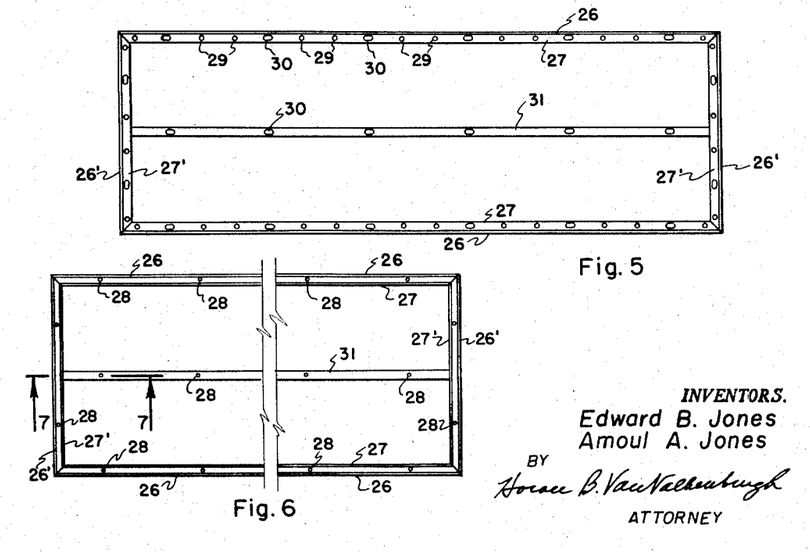
Fig. 5 is a bottom plan view of a panel frame.
Fig. 6 is a condensed top plan view of the panel frame.
Figure 7:
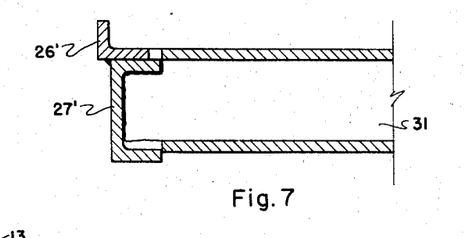
Fig. 7 is a fragmentary, enlarged vertical section taken centrally at one end of the panel frame along line 7—7 of Fig. 6.

The special corner angle or support A is shown in greater detail in the section of Fig. 13, and may include a bar formed to a flattened W shape, which may be considered to consist of a simple 90° angle 42, having an integral flange 43 at each edge which extends perpendicularly to the near side, but in the opposite direction from the other side of angle 42. A channel 44 may be permanently attached, as by welding, to each flange 43, the web of channel 44 being welded to the flange 43 with the surface of the inner flange of channel 44 being flush with the surface of the adjacent side of angle 42. The flanges of each channel 44 may be provided with holes comparable in size and distribution to the holes in the flanges of channels 27 and 27' of the panels P, i.e., the inner flange of each channel 44 may be provided with circular screw holes 28 and the outer flange with oblong holes 30 opposite thereto, and also with additional circular holes, similar in size and distribution to the holes 29 of the channels 27 and 27' of panels P, as shown in Fig. 5. Each side of the center angle 42 may also be provided with screw holes 28', for use when desired. As before, the oblong holes 30 permit easier access to the heads of the screws which are driven into the plywood through the screw holes 29, while the oblong holes 30 may also be utilized to receive a clip prong 39, in the event that one of the channels 44 abuts against a panel P.

The panels P may be utilized in constructing wall forms, as well as slab forms, such as in the manner illustrated in Figs. 14 and 15, in which a plurality of panels P are disposed in upright relation, being placed side by side and the adjacent channels 27 of the panels being fastened together by suitable clips 37, such as illustrated in Fig. 10 and described previously. The plywood surface of each panel P faces inwardly and the concrete is poured between the two walls formed thereby, the panels additionally being braced by bars 46, such as box-shaped channels, as shown in Fig. 15, which are disposed horizontally on opposite sides of the form at vertically spaced positions, and bear against the outside flanges of the channels 27 of the panels. The bars 46 on opposite sides of the form may be connected by rods 47, which may be threaded at their outer ends and nuts tightened thereon, as shown. As shown in Fig. 15, the whaler bars 46 are preferably box-shaped in cross section with a slot or opening along one side and longitudinally spaced holes opposite the slot or opening, thus producing the effect of two normal channels disposed face to face with their outer flanges connected and thereby providing the strength of a pair of channels and the additional stability provided by two bearing surfaces for the upright channels 27 and 27'. Each bar 46 may rest on a series of clips 37, which connect adjacent panels together, while the rods 47 may pass through suitable holes drilled in the wood of the panels P. The rods 47 may be "Superior" snap tie rods, i.e., having a weakened section, such as formed just outside an upset which retains a washer 48, so that after the forms are removed, the ends of the bars may be twisted or bent back and forth a few times to break off the bars at the edge of the concrete wall. Of course, suitable reinforcing structure is placed within the wall form, in a desired pattern, and in the proper locations. An angle brace 49 may be placed at a suitable number of positions, being conveniently connected to the outwardly extending leg of an angular bracket 50, the inner leg of which is removably secured to the channels 27, as by bolts extending through the holes 29 of Fig. 5. The outer leg of each bracket 50 may be provided with several holes, as shown, so that a brace 49 may be connected at various angles thereto, while each bracket 50 is also preferably connected at a position between two horizontal bars 46. As shown, the panels P are placed side by side in upright positions, thus forming a wall 6 feet in height. If an eight foot wall is to be poured, one set of panels may be placed upright and another set directly above on their sides and disposed end to end, to add two feet to the height; while if a ten foot wall is to be poured, one set of panels on their sides and placed end to end, at the bottom of the wall form, another set in upright position and side by side, and a third set on their sides and placed end to end but above the upright panels, may be utilized. The panel arrangement may also be varied, to produce a desired pattern on the surface of the wall, such as upright panels alternating with panels on their sides. Also, when the wall form is more than one panel high, some of the bars 46 may be vertical, rather than horizontal.

As shown in Fig. 14, when the wall form includes a corner, the outside of the corner is conveniently formed by the angle support A previously described, plywood sections 51 and 52 being attached thereto, as by screws, and extending to the panels P of the connecting wall forms. The bars 46 bear against the outer flanges of the angle support A, and also against the outer flanges of channels 53, which are attached to sections 51 and 52, as by screws. The flanges of channels 53 are provided with holes similarly to channels 27 of the panels P, but channels 53 may be wider than channels 27, to compensate for the thickness of angles 26. Or, plywood sections 51 and 52 may be thicker than the plywood sheets 24 of the panels P, again to compensate for the thickness of angles 26 of the panels P, in which case channels 53 may be identical to channels 27, being conveniently made from the same stock and punched or drilled identically. In any event, the outer flanges of channels 53 are preferably flush with the outer flange of the adjacent panel channel 27, so that bar 46 may bear against both, while the channels 53 are also attached to sections 51 and 52 along the edges of the latter so that each channel 53 may be connected to the adjacent panel channel 27 by several clips 37. At the inside of the wall corner, plywood sections 54 and 55 extend to the adjacent panels P, with the edge of one abutting against the side of the other and the two conveniently being attached together by an angle 56. Each section 54 and 55 is also attached to a channel 53, against which the inner bars 46 bear and which are preferably attached to the adjacent panel channels 27 by clips 37. Whenever the angles 56 or channels 53 available are shorter than the desired length, other angles 56 or channels 53, as the case may be, can be spliced thereto by short splice angles or channels or bars, attached to the parts to be spliced together. Such splice angles, channels or bars may be specially shaped to fit the contour of the parts to be spliced, and may be drilled at appropriate positions for attaching bolts and the like.

Figure 16:
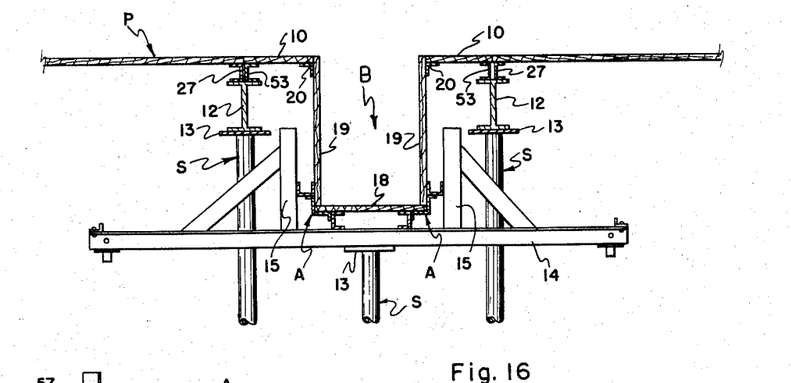
Fig. 16 is a vertical section, on an enlarged scale in comparison with Fig. 2, of a beam form and adjacent portions of a slab form.

As described previously, the beam forms may include an angle support A at each lower corner, which rests on the supporting beam 14, and the outer side flanges of which are engaged by clamps 15, as is also shown in Fig. 16. The side members 19 for the beam forms may be attached, as by screws, to the angle supports A, but with enough clearance at the bottom edge to permit the bottom members 18 to be slid into position after the side members 19 and angle supports A have been placed on the beams 14. Then, the clamps 15 may be tightened and additional attachment of the bottom members 18 to the angle supports A will normally be unnecessary. As also described previously, the side members 19 are connected to the skirts 10, as by angles 20, which may be attached thereto in any suitable manner, as by screws. In addition, each skirt 10 may be attached to a channel 53 which rests on a beam 12 and whose holes form interengaging means with the upper ends of the beam pins, as in the case of channels 27 of panels P. Also, each channel 53 may be spaced slightly from the edge of a skirt 50, so that clips 37 may attach a channel 53 to the adjacent panel channel 27. As will be evident, both the angle supports A and the channels 53, utilized at a corner in a wall form, are also utilized in connection with the beam and slab forms.

Figure 17:
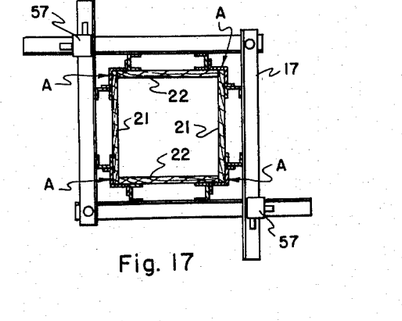
Fig. 17 is an enlarged horizontal section taken through a column form, along line 17—17 of Fig. 2.

As shown in Fig. 17, the corner or angle supports A may also be utilized in column forms, in which the side members 21 and the end members 22 are preferably formed of plywood cut to the desired width. The end members 22 only may be attached, as by screws, to the corner supports A, with sufficient clearance at the edges so that the side members 21 may be slipped into place and the clamps 17 placed in position and tightened. Thus, each end member 22 may be attached to two corner supports A prior to assembly, as with the end members 22 lying in flat position, thereby increasing the speed of erection. The clamps 17 may be conventional "Acrow" column clamps, which consist of two pairs of pivoted bars with adjustable take-up devices 57 at the opposite corners, although any other suitable type of clamp for encircling the column forms may be utilized. At the upper end of each column form, where the column form connects with the beam form, the end members 22 of the column form may be attached to the bottom members 18 of the beam form in any suitable manner, as by an angle connecting the two similarly to the manner in which angle 20 of Fig. 16 connects the side member 19 of the beam form with skirt 10. As indicated previously, suitable reinforcing rods may be installed within the column forms prior to pouring of the concrete.

As will be evident, the use of concrete forms constructed in accordance with this invention may result in numerous economies. The panels P may, of course, be made in the shop on a production basis, and the angles 53 may be produced simultaneously with panel channels 27. Thus, the only parts which need be cut specially for a specific job may be the bottom members 18 and side members 19 or 19' for the beam forms, the skirts 10 or 10', the side members 21 and end members 22 for the column forms, and the corner members 51, 52, 54 and 55 for the corner of a wall form. However, by anticipation in architectural design, the same sizes of beams and columns, particularly for one or two story buildings, can be utilized for many buildings. Thus, the beam and column form parts, as well as the panels P can be used again and again. Also, since the column sides are usually wider than the beam bottoms, if the desired sizes are not in stock, beam bottom members may be cut from used column side members, thus reducing the use of new stock. For various jobs, different sizes of panels may be provided, since the size of the panels is not limited to 2 feet by 6 feet, but may be 2 feet by 4 feet, 2 feet by 5 feet, or any other desired length and width. The panels P, of course, can be used as component parts for various slab and wall dimensions, while the side members 19 of the beam forms can be stored or handled with a corner support A attached thereto, and the end members 22 of the column forms, with two corner supports A attached to each, may similarly be stored or handled. Thus, only the initial attaching operation is necessary for each and through the use of power driven screw drivers, such attaching operations may be performed at a minimum of expense. The outside sections 51 and 52 for a wall corner may readily be attached to a corner support A and a pair of channels 53 before the form is finally assembled, while the inside sections 54 and 55 for a wall corner may similarly be attached to an angle 56 and a pair of channels 53 prior to erection of the wall form.

In erecting the slab and beam forms, the shores S may be placed in position and suitable cross bracing attached thereto, so that the I-beams 12 may be placed atop appropriate shores and beams 14 for the beam forms placed atop other shores. Then, the panels P may be placed on the I-beams for supporting the same, and attached together by clips 37. The skirts 10 and 10' may previously be attached to the sides of the beam forms which may be placed in position and the bottoms slipped therein. The skirts may then be attached by clips 37 to the adjacent panels, after which the beam form clamps 15 may be tightened. The ends of the column forms may be placed in position, the sides slipped therein, and the clamps 17 then placed in position and tightened. If a wall is to be poured, the corner assemblies may be placed in position and the panels attached thereto and to each other in succession, the rods 47 being placed in position at the same time. Then the bars 46 may be connected to the rods, and, finally, any necessary angle braces installed. As will be evident, the foregoing operations may be carried out in a short time.

After the concrete has set, the forms are readily stripped therefrom and disassembled. Thus, the shores S, I-beams 12, and beam form supports are readily removed, the clips 37 also being easily removed, and the panels P pulled down. When the beam supports are removed, the beam forms and skirts 10 with them are easily pulled down together. Also, after the clamps 17 have been removed, the end sections 22 of the column forms may be pulled away from the column, the corner supports A readily sliding past the side sections 21, and the latter may then be stripped off the column. Thus, about the only disconnection necessary may be the angles, if used, connecting the column forms to the under side of the beam forms.

As will also be evident, the plywood parts can be used numerous times, since no nails are driven therein and the principal connections between parts are metal to metal, such as between the panels and I-beams, and between the I-beams and shores, which involve the pins 33. Also, the metal clips 37 engage the metal channels of the panels or other parts. Thus, the wood to metal connections remain, with few exceptions, and the relatively permanent connections provided by wood screws may be utilized. When both walls and a floor are to be poured, the walls may be poured first, and the panels P used for the wall forms may be used for the slab form after being stripped from the concrete walls. Thus, the total number of panels to be shipped to that construction job may be reduced considerably.

Although a specific embodiment of this invention and the preferred parts thereof have been described with particularly, it will be understood that other embodiments may exist and various changes made therein, all without departing from the spirit and scope of this invention.

What is claimed is:

1. In a form for concrete and the like, at least two adjacent substantially coplanar horizontal panels, each comprising a flat, rectangular wood sheet, a metal frame attached thereto and extending around and enclosing the sides and ends thereof, said frame having a depending portion spaced inwardly from the outer edges thereof and providing a flange having a surface substantially parallel to said wood sheet, at least said flanges along the sides of said panel being provided with longitudinally spaced slots and longitudinally spaced holes; at least one clip for simultaneously engaging slots in adjacent flanges of two said panels disposed in side by side relationship; and a beam for supporting said panels, said beam being provided with upwardly extending pins for engaging at least one hole of each said flange.

2. In a form for concrete and the like, as defined in claim 1, wherein said support comprises a beam provided with pins extending from the upper surface of said beam for engaging at least two flange holes.

3. In a form for concrete and the like, at least two panels, each comprising a flat, rectangular wood sheet, a metal frame attached thereto and extending around and enclosing the periphery thereof, said frame having a depending portion spaced inwardly from the outer edges thereof and providing a flange having a lower surface substantially parallel to said wood sheet, at least one of said flanges along the sides of said panel being provided with longitudinally spaced slots and longitudinally spaced holes; at least one clip for engaging slots in adjacent flanges of two said panels disposed in side by side relationship; a beam for supporting said panels, said beam being provided with pins extending upwardly from the upper surface of said beam and downwardly from the lower surface of said beam, said upwardly extending pins engaging at least two flange holes of said panels; and a shore having a plate at its upper end provided with holes for receiving said downwardly extending pins.

4. In a form for concrete and the like, a series of panels adapted to be placed horizontally each comprising a flat rectangular plywood sheet, peripheral angles extending around the edges of said sheet with one leg of each angle beneath said sheet, said angles forming a rectangle having a length a multiple of its width, an outer channel having an upper flange attached to the underside of each said angle with the outer edge of said channel spaced inwardly from the outer edge of said angle and said channel flanges facing inwardly, a central channel extending longitudinally between said end channels and welded thereto, the upper surface of the upper flange of said central channel being level with the upper surface of the inwardly extending legs of said angles, means attaching said sheet to said angles and channels, and spaced circular holes in the lower flanges of said outer channels; and a support for a plurality of such panels, comprising a beam having upper and lower flanges with pairs of aligned holes therein, and pins extending through said holes and welded to said beam with at least the upper end of each pin extending above the upper flange, each pair of pins being spaced apart laterally a distance equal to that between a pair of said circular holes in said lower flanges of said outer channels of said panels and having a size and shape corresponding thereto and said pins being spaced apart longitudinally a distance such that the ends of a series of said panels will rest on said beam in side by side relation and the ends of another series of panels will rest on said beam in side by side relation, with the upwardly extending end of each pin in a circular hole in the lower flange of an outer channel of a panel.

5. In a form for a rectangular beam of concrete and the like, wherein flat wood members provide the concrete engaging bottom and sides of said form, corner supports for the lower corners of said wood members, each comprising a metal angle having perpendicular legs and a flange extending outwardly from each end of said leg, one leg being a side leg and the other leg a lower leg; a pair of channels, each having a web and lateral flanges, one channel being a side channel and the other channel a lower channel, with said web of said side channel attached to said side leg and the web of said lower channel attached to said lower leg, an inner flange of each said channel forming a continuation of the adjacent leg of the corresponding angle; supporting means engaging the outer lateral flanges of said lower channels; and clamping means engaging the outer lateral flanges of said side channels, the lower edges of said side wood members and the side edges of said bottom wood members being received by said angles with said corner supports disposed in opposite positions.

6. A corner support for a form for concrete and the like, wherein flat wood members provide the concrete engaging sides and bottom of a rectangular horizontal beam form, the concrete engaging sides and ends of a rectangular vertical column form, or the adjacent edges at a corner of a wall form, said corner support comprising an elongated metal angle having perpendicular legs and a flange extending outwardly from each end of each leg; a pair of channels having a web and lateral flanges with said web of one channel attached to one said angle flange and the web of the other channel attached to the other said angle flange, an inner flange of each said channel forming a continuation of the adjacent leg of said angle, said inner flanges having spaced circular holes therein and the opposite flanges having elongated slots opposite said holes.

7. A form for a rectangular vertical column of concrete and the like, comprising four corner supports, one disposed at each corner of said form and each comprising an elongated metal angle having perpendicular legs and a flange extending outwardly from each end of each leg, a pair of channels having a web and lateral flanges with said web of one channel attached to one said angle flange and the web of the other channel attached to the other said angle flange, an inner flange of each said channel forming a continuation of the adjacent leg of said angle; side members of wood; end members of wood, each attached to two corner supports with the edges thereof spaced from the angle leg perpendicular thereto a distance corresponding to the thickness of said side members, the edges of said side members being received in said spaces; and clamping means surrounding said four corner supports and engaging the outer flanges of said channels.

8. In a form for a rectangular vertical column, as defined in claim 7, wherein said inner flanges of said channels have spaced circular holes therein and the opposite flange has elongated slots opposite said holes.

9. In a form for a slab of concrete or the like, a series of generally rectangular horizontal panels having depending flanges around the sides and ends thereof and adapted to be placed in side by side and end to end abutting relationship; means for releasably securing adjacent flanges of abutting panels together; a series of beams for supporting said panels, said beams having webs and lower flanges and being normally disposed in spaced, generally parallel relationship and said panels resting on said beams, said beams also being adapted to be placed in end to end relationship, the lower flanges of said beams having holes therein adjacent the ends of said beams for pins adapted to extend beneath said beam lower flanges, said holes being disposed in pairs with one hole of each pair on opposite sides of said web; a series of shores for supporting said beams and each having an upper plate provided with four holes disposed in a relationship corresponding to the four corners of a rectangle; and a series of pins extending through at least one pair of holes in each beam and a corresponding pair of holes in a shore plate, said holes in the beam being spaced from the end of each beam a distance such that two beams disposed end to end may be connected to the same shore plate by two pairs of said pins.

10. In a form for concrete and the like, at least two adjacent substantially coplanar panels, each comprising a flat rectangular wood sheet, a metal frame attached thereto and extending around and enclosing the sides and ends thereof, said frame having a depending portion spaced inwardly from the outer edge thereof and providing a flange having opposite surfaces substantially parallel to said wood sheet; at least said flanges along the sides of said panels being provided with longitudinally spaced slots; at least one clip for simultaneously engaging slots in adjacent flanges of two said panels disposed in side by side relationship and said clip comprising a relatively flat body having a width corresponding to the combined width of said adjacent panel flanges and the space therebetween; a flange at each side of said body and extending angularly thereto, said clip flanges engaging the opposed sides of said panel flanges; a pair of longitudinally extending, laterally spaced prongs struck from said clip body and extending angularly thereto and then substantially parallel thereto, said prongs extending through said flange slots and engaging the surface of said panel flanges opposite those engaged by said clip body; and a lateral flange extending generally in a direction opposite said side flanges and from the end of said body opposite the end toward which said prongs extend.

11. A panel adapted to be placed horizontally for concrete forms and the like, comprising a flat rectangular plywood sheet having a length a simple multiple of its width; a series of peripheral angles extending around the edges of said sheet with one leg of each angle beneath said sheet; an outer channel having an upper flange attached to the underside of each said angle with the outer edge of said channel spaced inwardly from the outer edge of said angle and said channel flanges facing inwardly; a central channel extending longitudinally between said end channels and welded thereto, said central channel having an upper flange whose upper surface is level with the upper surface of the inwardly extending legs of said angles; a series of spaced holes in said upper flanges of said channels and inwardly extending legs of said angles; screws in said holes attaching said sheet to said angles and channels; a spaced series of spaced pairs of circular holes in the lower flanges of said outer channels; a series of elongated holes in said lower flanges of said outer and center channels and aligned with said holes in the upper flanges thereof, said elongated holes in said outer channels being interspaced with said pairs of circular holes therein; an I-beam having pairs of aligned holes in its upper and lower flanges with the holes of each pair on opposite sides of the web thereof, one pair of holes being adjacent each end and two pairs of holes at the center; and pins extending through said holes and welded to said I-beam, the upper end of each pin extending above the upper flange and the lower end of each pin extending below the lower flange thereof, each pair of pins being spaced apart laterally a distance equal to that between a pair of said circular holes in said lower flanges of said outer channels of said panel and having a size and shape corresponding thereto and said pins being spaced apart longitudinally a distance such that the ends of four of said panels will rest on said beam in side by side relation and the ends of another four panels will rest on said beam in side by side relation with the upwardly extending end of each pin in a circular hole in the lower flange of an outer channel of one of said panels.

12. In a form for concrete and the like, at least two adjacent substantially coplanar panels, each comprising a flat, rectangular wood sheet, a metal frame attached thereto and extending around and enclosing the sides and ends thereof, said frame having a depending portion spaced inwardly from the outer edges thereof and providing a flange having a surface substantially parallel to said wood sheet, said flanges along the sides of said panels being provided with longitudinally spaced slots; and at least one clip having a relatively flat body, a flange at each side and a pair of spaced prongs extending angularly to said body and then substantially parallel to said body, for simultaneously engaging adjacent flanges of two said panels disposed in side by side relationship, with said clip body engaging said surfaces of said panel flanges, said clip flanges engaging the sides of said panel flanges and said prongs extending through said slots in said panel flanges.

References Cited in the file of this patent

UNITED STATES PATENTS

| | | |
|---|---|---|
| 775,685 | Shute et al. | Nov. 22, 1904 |
| 812,006 | Bovee | Feb. 6, 1906 |
| 875,219 | Schammel | Dec. 31, 1907 |
| 1,176,005 | Waite | Mar. 21, 1916 |
| 1,212,499 | Kemon | Jan. 16, 1917 |
| 1,235,542 | Bagby | Aug. 7, 1917 |
| 1,537,835 | Lally | May 12, 1925 |
| 1,640,997 | Hollister | Aug. 30, 1927 |
| 1,675,749 | Crawford | July 3, 1928 |
| 1,784,237 | Kaiser | Dec. 9, 1930 |
| 1,898,319 | Soule | Feb. 21, 1933 |
| 1,970,547 | Anderson | Aug. 21, 1934 |
| 2,038,296 | Kendrick | Apr. 21, 1936 |
| 2,101,551 | Marsh | Dec. 7, 1937 |
| 2,101,552 | Marsh | Dec. 7, 1937 |
| 2,170,564 | Lundin | Aug. 22, 1939 |
| 2,296,782 | Fischer et al. | Sept. 22, 1942 |
| 2,423,955 | Widener | July 15, 1947 |
| 2,616,148 | Hawes | Nov. 4, 1952 |
| 2,631,352 | Williams | Mar. 17, 1953 |

FOREIGN PATENTS

| | | |
|---|---|---|
| 804,256 | Germany | May 10, 1951 |
| 807,995 | Germany | July 9, 1951 |